(No Model.)

D. E. McSHERRY.
Hoe and Shovel for Grain Drills.

No. 232,290.

Patented Sept. 14, 1880.

Attest.
Sidney P. Hollingsworth
Nathan C. Saul.

Inventor:
D. E. McSherry
By Dodge & Son
Attys.

UNITED STATES PATENT OFFICE.

DANIEL E. McSHERRY, OF DAYTON, OHIO.

HOE AND SHOVEL FOR GRAIN-DRILLS.

SPECIFICATION forming part of Letters Patent No. 232,290, dated September 14, 1880.

Application filed April 19, 1880. (No model.)

*To all whom it may concern:*

Be it known that I, DANIEL E. MCSHERRY, of Dayton, in the county of Montgomery and State of Ohio, have invented certain Improvements in Hoes and Shovels for Grain-Drills, &c., of which the following is a specification.

The object of this invention is to provide a cheap and simple method of securing the points or shovels of grain-drill hoes or teeth detachably thereon; and to this end it consists in providing the sides of the point with flanges or lips engaging in grooves in or over ribs upon the sides of the hoe, the two parts to be united and separated by sliding the point endwise.

Ordinarily I make the drill-hoe of the usual form in all respects, except that it has two grooves formed in the outer sides from the lower end upward about six or eight inches. The hoe-point or shovel, made of wrought-iron or steel plate, as usual, has its two side edges curled or folded backward to form flanges or lips to enter the grooves in the hoe. The point is applied by slipping it upward into place upon the hoe, and it is retained firmly in position by the lips engaging in the grooves.

The lips on the sides of the shovel may be continuous and extend its entire length, or one or more short lips may be used on each side, the single lips located midway in the height.

The grooves in the sides of the hoe may be continuous or not, and in place of the grooves projecting ribs used to engage with the lips of the shovel.

Figure 1:
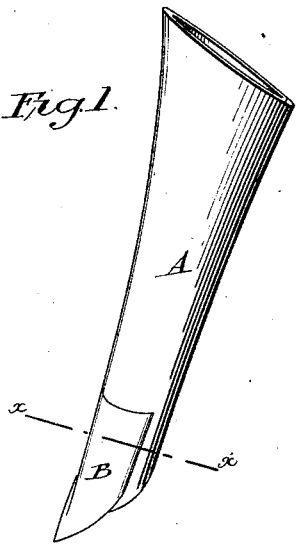
Figure 2:
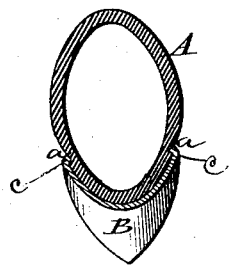

In the accompanying drawings, Figure 1 represents a perspective view of the improved hoe and point; Fig. 2, a cross-section of the same on the line *x x*.

A represents the hoe, having the grooves *a* in its sides, and B represents the point or shovel, having the side lips, *c*, seated in the grooves.

The form of the hoe and shovel may be changed as desired, provided the improved method of uniting them is retained.

The improvement may be used on other machines than grain-drills with equal advantage.

I am aware that shovels have been provided with circular clamps or rings upon their backs to encircle a hoe or standard; and I am also aware that the wide short points used in potato-digging machines and peculiar classes of cultivators have been provided with an extension or prolongation adapted to engage with the supporting device, and I lay no claim to either of said constructions.

My construction is peculiarly applicable to the common grain-drill hoe, and is distinguishable from other arrangements in that my shovels are not elongated or provided with any extra or additional parts.

My shovels have their sides or edges—that is to say, the edges of the body or usual working portion—curled backward and arranged to interlock with the sides of the hoe. This renders the cost of construction very cheap, avoids the use of unnecessary metal, and gives the shovel a direct and firm attachment at the point where the strain is received.

What I claim as my invention is—

The combination of the hoe having its sides provided with the upright grooves or their described equivalents, and the point or shovel made of ordinary length, and having the sides of its body or operative portion curled backward and seated in the grooves.

DANIEL E. McSHERRY.

Witnesses:
D. B. WILCOX,
JOHN A. SHANCK.